tent Office 3,036,890
Patented May 29, 1962

3,036,890
PREPARATION OF DIBORANE
Carl D. Good, Los Angeles, Calif., assignor to Olin Mathieson Chemical Corporation, a corporation of Virginia
No Drawing. Filed Nov. 15, 1957, Ser. No. 696,881
7 Claims. (Cl. 23—204)

This application is a continuation-in-part of my copending application Serial Number 541,517, filed October 19, 1955, now abandoned.

My invention relates to a new method for the production of diborane.

It has heretofore been proposed to produce diborane by reacting boron trifluoride and lithium hydride in ether solution. This method suffers from various disadvantages from the standpoint of the materials involved. Thus, the method employs lithium hydride, a hydride of a metal which is not found widely distributed in nature. Hence it would be desirable to have available a method for the production of diborane based upon the use of a hydride of a metal which is more widely found, for example, sodium. Moreover, the known method is based upon the use of boron trifluoride, and does not involve the use of boron trichloride, a material which the art knows how to produce by passing chlorine gas through a mixture of boric oxide and carbon at elevated temperatures. Finally, the known method involves the use of diethyl ether, a solvent which is hazardous to handle.

In accordance with my present invention, I have devised a method whereby diborane can be produced in good yield in a controllable reaction using a hydride of a metal which is widely found, namely sodium borohydride. The process which I have invented, moreover, involves the use of boron trichloride.

The reaction of sodium borohydride and boron trichloride to produce diborane is a difficult one to carry out if one is to produce the desired product in good yield. I have discovered, however, that good results from the standpoint of yield and reaction control are obtained provided that the reaction is effected by introducing the boron trichloride into a slurry of the sodium borohydride in benzene, a lower alkylated benzene or a mixture thereof. The reaction mixture must also contain aluminum trichloride, aluminum tribromide or a mixture thereof.

The following examples illustrate in detail various embodiments falling within the scope of my invention. In these examples the term "moles" signifies "gram moles."

EXAMPLE I

The reactor used was a 500 ml. round bottomed flask equipped with a thermowell and a high speed stirrer. The reactor was attached to a series of four collection traps through a long spiral condenser. The condenser was cooled by circulation of methanol which had passed through a Dry Ice-acetone slush. A nitrogen atmosphere was maintained in the reactor at all times.

Boron trichloride (previously purified by distillation through a low temperature glass helicies packed fractionation still) was passed as a gas from a cylinder through a calibrated rotometer to the reactor.

0.0443 mole sodium borohydride (97.3 percent pure by analysis) was stirred with 0.0600 mole aluminum trichloride for 10 minutes at 25.0° C. in 300 ml. of benzene (previously dried with sodium hydride). At the end of this time 0.0205 mole boron trichloride was added over a period of 30 minutes at temperatures from 25 to 60° C. For the remaining time of 65 minutes the temperature was maintained at 60 to 80° C. At the end of the reaction, the product gases were forced by a stream of dry nitrogen through the condenser and then through a trap cooled with a Dry Ice-acetone slush (−78° C.). The product gases were finally condensed in a series of three traps cooled with liquid nitrogen (−196° C.). The non-condensable gases were then pumped away and the product gases purified by warming and passing through a trap cooled to −130° C. (vacuum fractionation). This gas was then measured in a calibrated portion of a high vacuum apparatus and was found to consist of 0.0273 mole. Infrared analysis of this gas showed that it consisted of 88 percent diborane with a trace of chloroboranes. On the basis of the sodium borohydride originally present, the yield of diborane was 81 percent. This calculation is based on the assumed equation:

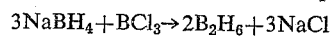
$$3NaBH_4 + BCl_3 \rightarrow 2B_2H_6 + 3NaCl$$

EXAMPLE II

In the following two experiments, an apparatus designed to measure the continuous evolution of diborane was used. The reactor was a 1 liter, 3 neck, round bottom flask, equipped with a thermowell and a high speed stirrer. The reactor was attached through a spiral condenser (cooled by circulation of methanol which has passed through copper coils immersed in a Dry Ice-acetone slush) to a series of two gas washing bottles. The first of these contained pure methanol and the second contained water and methanol in a 1:5 volume ratio. The second gas washing bottle was connected through a second spiral condenser (cooled in the same manner as the first) to a wet test meter previously calibrated for measurement of hydrogen gas. Nitrogen and boron trichloride were passed as gases through calibrated rotameters directly into the reactor.

In experiment A, 0.257 mole of sodium borohydride (97.3 percent pure by analyses) was stirred with 0.338 mole aluminum trichloride for 41 minutes at 30 to 31° C. in 600 ml. of benzene (dried with sodium ribbon). At the end of this time, boron trichloride (0.0994 mole), was added over a period of 103 minutes at temperatures from 32.5 to 68.8° C. After addition of boron trichloride, the temperature of the reactants was held at 71.8 to 84.5° C. for the remaining time of 55 minutes. During the last 19.6 minutes of the reaction, a nitrogen flow was maintained through the reactor at a rate of 85.5 cc. per minute.

During the reaction diborane from the reaction passed through the first spiral condenser and was hydrolyzed in the gas washing bottles to produce presumably 6 moles of hydrogen per mole of diborane:

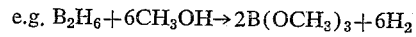
e.g. $B_2H_6 + 6CH_3OH \rightarrow 2B(OCH_3)_3 + 6H_2$

The water-methanol mixture in the second gas washing bottle was to insure complete hydrolysis. The hydrogen gas, thus produced, passed through the second spiral condenser and was measured with the Wet Test Meter. At the end of the reaction, the total amount of gas passing through the meter registered as 26.4 liters. Deducting the amount due to the nitrogen flow near the end of the reaction (1.68 liters), 24.7 liters was assumed to be hydrogen produced from the hydrolysis of diborane. At an atmospheric pressure of 745 mm. Hg, and 30.0° C., the calculated amount of hydrogen produced from hydrolysis of the diborane that would be produced if the sodium borohydride reacted completely to form diborane was 25.9 liters. The yield of diborane, on the basis of the active hydrogen in the product gases was hence 95.4 percent.

In experiment B, 0.257 mole sodium borohydride (97.3 percent pure by analysis) was stirred with 0.338 mole aluminum trichloride for 27 minutes at 33.5 to 60° C. in 600 ml. of benzene (dried with sodium ribbon). At the end of this time, boron trichloride (0.133 mole) was added over a period of 30.4 minutes at temperatures from 60 to 69° C. After addition of boron trichloride, the temperature of the reactants was held at 69 to 80.7° C. for the remaining time of 50.1 minutes. No nitrogen flush was used in the experiment. The amount of gas passing through the Wet Test Meter was 25.34 liters, at 744.1 mm. Hg barometric pressure, and 35.2° C. The theoretical amount of hydrogen calculated for complete reaction of the sodium borohydride was 26.4 liters. The yield of diborane was hence $$\frac{100 \times 25.34}{26.4} = 96.0\%$$

During the early stages of the addition of boron trichloride to the reaction mixture, it was noted that the rate of evolution of diborane from the reactor was equivalent (stoichiometrically) to within 2 percent of the rate of addition of boron trichloride, indicating the reaction is extremely rapid at these temperatures (63° C. and above). When the temperature of the reactor was lowered slightly, the evolution of diborane decreased sharply, but resumed a rapid rate when the temperature of the reactor was raised again.

EXAMPLE III

The reactor used in this experiment was of 75 ml. capacity and was equipped with a gas bubbler and thermowell. Agitation of the reaction mixture was maintained by use of a magnetic stirrer. The reactor was attached through a water-cooled condenser and a Dry Ice-acetone filled cold finger to a series of four collection traps all covered with liquid nitrogen. A nitrogen atmosphere was maintained in the reactor at all times.

In the experiment, 0.0770 mole sodium borohydride and 0.00108 mole aluminum chloride were mixed in 40 ml. of anhydrous benzene and heated from room temperature (24.5° C.) to 78.0° C. over a period of 3.5 minutes. At this time boron trichloride (0.0368 mole) was introduced to the reaction mixture from a weighed cylinder via a calibrated rotameter through the gas bubbler. The temperature of the reaction medium during the addition ranged from 78.0° C. to 76.5° C., and the addition period was 18.5 minutes. After the addition of boron trichloride the reaction mixture was stirred for 6.5 minutes at a temperature of 76.5 to 78° C. At the end of this time more aluminum chloride (0.00277 mole) was added gradually over a period of 10 minutes at 78.0° C. The reaction mixture was then maintained at 78° C. over a period of 25 minutes during which time the reactor was flushed with dry nitrogen. The product gases were finally condensed in the series of four cold traps cooled with liquid nitrogen (−196° C.). The non-condensible gases were then pumped away and the product gases purified by warming and passing through a trap cooled to −130° C. (vacuum fractionation). The resulting product gas was then measured in a calibrated portion of the high vacuum apparatus and was found to consist of 0.0488 mole. Infrared analysis of this gas showed that it consisted of approximately 92 percent diborane. On the basis of the sodium borohydride initially present, the yield of diborane was 88 percent.

EXAMPLE IV

The reactor used in this experiment was a 100 ml. flask equipped with a high speed stirrer and a gas inlet for the addition of boron trichloride and nitrogen and an outlet connected to a cold finger. The Dry Ice-acetone filled cold finger was, in turn, attached to a series of four collection traps all cooled with liquid nitrogen to −196° C. These traps were also part of a calibrated high vacuum system. In this experiment 0.0770 mole sodium borohydride and 0.00355 mole of aluminum chloride were mixed in 75 ml. of anhydrous toluene and heated from room temperature to 55° C. over a period of 6 minutes. Previous to the addition of these materials the reaction system had been thoroughly purged with nitrogen. When the contents of the flask had reached 55° C., 0.0304 mole of boron trichloride was introduced into the reaction mixture from a weighed cylinder through a calibrated rotameter. The gas was admitted to the reaction flask through the gas inlet which allowed the boron trichloride to enter the reaction flask at a point above the liquid level. The temperature of the reaction mixture during the addition of the boron trichloride increased from 55° C. to 110° C. and the addition period was 10 minutes. At the end of this time the reaction mixture was maintained at 108° to 112° C. for a period of 44 minutes during which time the reactor was flushed with nitrogen. Condensible gases were removed from the gas stream leaving the reactor by passage through the four cold traps which were cooled with liquid nitrogen to −196° C. Non-condensible gases were then pumped away and the product was purified by warming the material trapped in the four traps maintained at −196° C. and passing it through a trap cooled to −130° C. The gas so trapped in the −130° C. trap was then measured in the calibrated portion of the high vacuum apparatus and was found to consist of 0.0481 mole. By infrared analysis it was shown that this gas contained 97 percent diborane and on the basis of the sodium borohydride charged to the reactor, the yield of diborane was 91 percent.

EXAMPLE V

In this experiment a 1000 ml., three-necked flask equipped with a paddle stirrer was employed. Gases from the reactor were passed through a reflux condenser. Methanol which had been passed through a Dry Ice-acetone mixture was circulated through the condenser jacket as a coolant; the temperature of this condenser was −78° C. The condenser gases leaving the reactor were passed through a scrubbing tower in order to hydrolyze the diborane produced in the experiment. This tower, which was constructed of Pyrex glass, was 5′ tall, 3″ in diameter and packed with ½″ Raschig rings. Through the tower there was circulated a solution of 50 percent acetone and 50 percent water. The solution was introduced at the top of the tower. A 2000 ml. flask was used to collect the acetone solution at the bottom of the tower and the acetone-water mixture was continuously re-circulated back to the top of the tower. Gases from the reactor entered the scrubbing tower at a point one-third of the way up from the bottom of the tower and from the top of the tower any gases not reacting with the acetone-water solution were allowed to escape through a 16″ Leibig condenser which was cooled by methanol. The temperature of the coolant was maintained at −78° C. by circulating it through a Dry Ice-acetone mixture. Gases from the reactor entered the scrubbing tower through a ½″ glass tube which was inclined slightly downward.

Before adding any of the reactants to the reactor, nitrogen was passed through the system in order to purge it completely of any oxygen-containing gases. To the 432.5 ml. of toluene previously charged to the reactor there was added 50 g. of 97.3 percent sodium borohydride in powdered form. Then 1.5559 g. of powdered aluminum chloride was added to the reactor. The flask and contents were then heated to 80° C. during which time the condensers were cooled to their operating temperature by circulation of the cold fluid. In the next step boron trichloride in the amount of 64.0 g. was introduced through a rotameter into the reaction system over a period of 74 minutes. The gaseous boron trichloride passed into the reactor and under the surface of the reaction mixture through a dip tube. During the addition of the boron trichloride the temperature of the reaction mixture rose gradually to 110° C., the reflux temperature. At the conclusion of the reaction the system was again purged with nitrogen which was added through the same dip tube utilized for the addition of the gaseous boron trichloride; this purge took place over a period of 50 minutes.

The acetone-water mixture which had been utilized as a scrubbing liquid in the scrubbing tower was then analyzed for boron and hydrogen chloride. By analysis it was shown that this liquor contained 16.389 g. of boron which corresponds to a yield of diborane of 88.5 percent.

A series of experiments were performed in a manner similar to that of Example IV and the results of these experiments, Examples VI, VII and VIII are shown in Table 1. In Example VII the solvent used was cyclohexane. In Example VIII the aluminum halide utilized was aluminum bromide rather than aluminum chloride.

Table 1

| Ex. No. | NaBH$_4$, Moles | AlCl$_3$, Moles | BCl$_3$, Moles | Medium, ml. | Addition of BCl$_3$ | | Reaction | | Yield B$_2$H$_6$, Percent | Comments |
|---|---|---|---|---|---|---|---|---|---|---|
| | | | | | mmoles per min. | Temp., °C. | Temp., °C. | Time, Min. | | |
| IV | 0.0770 | 0.00355 | 0.0304 | Toluene 75 | 3.04 | 55–110 | 108–112 | 44 | 91 | Temp. is "skin" temp; high speed stirring. |
| VI | 0.0770 | 0.000908 | 0.0300 | Toluene 50 | 3.00 | 60–104 | 104–110 | 55 | 92 | Do. |
| VII | 0.0770 | 0.00247 | 0.0329 | Cyclohexane 50. | 3.29 | 79–72 | 72–75 | 55 | 30 | Do. |
| VIII | 0.0770 | AlBr$_3$ 0.00194 | 0.0300 | Toluene 50 | 3.0 | 70–104 | 99–101 | 35 | 72 | Magnetic Stirring. Do. |

Benzene—anhydrous, thiophene free—dried with NaH prior to use.
Toluene—reagent grade, dried with NaH prior to use.
Cyclohexane—dried with NaH prior to use.
Sodium borohydride (97.3 percent pure by analysis).

Various modifications can be made in the procedures of the specific examples to provide other embodiments which fall within the scope of my invention. In the examples, benzene and toluene were employed as a reaction medium but in their place there can be substituted lower alkylated benzenes, particularly those containing a total of not more than 6 carbon atoms in the alkyl radicals, for example, xylene, ethyl benzene, n-propyl benzene, cumene, 1,2-diethyl benzene, 1,3-diethyl benzene, 1,4-diethyl benzene, p-cymene, 1,3,5-triethyl benzene and 1,3-dimethyl-5-propyl benzene or mixtures thereof. If desired, calcium borohydride or magnesium borohydride can be substituted for the sodium borohydride, and gallium trichloride can be used in place of aluminum trichloride or aluminum tribromide. The specific examples also illustrate that the relative proportions of borohydride, aluminum trichloride or equivalent, boron trichloride and the reaction medium, as well as the reaction temperature, can be varied considerably. In general, however, the reaction mixture will contain from 0.025 to 1.0 mole of sodium borohydride or equivalent per 100 ml. of reaction medium (benzene or equivalent) and will contain from 0.01 to 3 moles of aluminum trichloride or equivalent per mole of sodium borohydride or equivalent. Also, in general, from 0.2 to 3 moles of boron trichloride per mole of sodium borohydride or equivalent is introduced into the reaction mixture. The reaction temperature will generally be within the range from 25 to 125° C.

I claim:

1. A method for the production of diborane which comprises reacting boron trichloride at a temperature of 25° C. to 125° C. with a slurry formed by admixing sodium borohydride and a halide selected from the group consisting of aluminum tribromide and aluminum trichloride in a reaction medium selected from the group consisting of benzene and alkyl benzenes having a total of not more than 6 carbon atoms in the alkyl radicals, and recovering diborane from the reaction mixture.

2. The method of claim 1 wherein the reaction mixture is formed by admixing from 0.025 to 1.0 gram mole of sodium borohydride per 100 ml. of said reaction medium, wherein the reaction mixture is formed by admixing from 0.01 to 3 moles of said halide per mole of sodium borohydride, and wherein from 0.2 to 3 moles of boron trichloride are introduced into the reaction mixture per mole of sodium borohydride.

3. The method of claim 2 wherein said halide is aluminum trichloride.

4. The method of claim 2 wherein said halide is aluminum tribromide.

5. The method of claim 2 wherein said reaction medium is benzene.

6. The method of claim 2 wherein said reaction medium is toluene.

7. The method of claim 2 wherein said halide is aluminum trichloride and wherein said reaction medium is benzene.

References Cited in the file of this patent

UNITED STATES PATENTS

| 2,542,746 | Banus | Feb. 20, 1951 |
| 2,543,511 | Schlesinger et al. | Feb. 27, 1951 |
| 2,550,985 | Finholt | May 1, 1951 |

OTHER REFERENCES

Hurd: "Chemistry of the Hydrides," page 87 (1952), John Wiley & Sons, New York, N.Y.

Goodwin and Schroder: "Boron, Boron Hydrides and Related Substances," Part II, AD 85727 Armed Services Technical Agency, pages 65, 66, Item U–153 (compiled for the Bureau of Aeronautics, April 1955).

Schechter et al.: "Boron Hydrides and Related Compounds," Jan. 8, 1951, pp. 54–57, declassified Jan. 5, 1954; Dept. of Navy, Bureau of Aeronautics.

Finholt et al.: "J. Am. Chem. Soc.," vol. 69, pp. 1199–1203 (1947).

Finholt et al.: "Progress Report," NOa(s)–9901 Bureau of Aeronautics, Oct. 23, 1948, page 2, received Navy Research Section, Science Div., Reference Dept., Library of Congress, June 30, 1950.

Wiberg: "Angewandte Chemie," vol. 65, page 19 (1953).